(12) United States Patent
Kessler (10) Patent No.: US 9,274,729 B2
(45) Date of Patent: Mar. 1, 2016

(54) PRINT FUNCTION SYSTEM AND METHOD FOR SECURE CLOUD DATA STORAGE (71) Applicant: Sean Kessler, Andover, NJ (US)

(72) Inventor: Sean Kessler, Andover, NJ (US)

( * ) Notice: Subject to any disclaimer, the term of this patent is extended or adjusted under 35 U.S.C. 154(b) by 0 days.

(21) Appl. No.: 14/733,382

(22) Filed: Jun. 8, 2015

(65) Prior Publication Data
US 2015/0378656 A1 Dec. 31, 2015

Related U.S. Application Data (60) Provisional application No. 62/016,803, filed on Jun. 25, 2014.

(51) Int. Cl.
*G06F 3/12* (2006.01)
(52) U.S. Cl.
CPC ............ *G06F 3/1248* (2013.01); *G06F 3/1228* (2013.01); *G06F 3/1276* (2013.01)
(58) Field of Classification Search
USPC ....................................................... 358/1.13
See application file for complete search history.

(56) References Cited

U.S. PATENT DOCUMENTS

| 7,404,108 | B2 | 7/2008 | Caplan et al. |
| 2006/0112145 | A1 | 5/2006 | Rieger et al. |
| 2008/0294976 | A1 | 11/2008 | Rosenberg |
| 2009/0265722 | A1 | 10/2009 | Lu et al. |
| 2010/0134818 | A1* | 6/2010 | Minamizono ......... G06F 3/1288 358/1.13 |
| 2011/0194140 | A1 | 8/2011 | Sweet et al. |
| 2011/0208836 | A1* | 8/2011 | O'Fallon ................ G06Q 10/00 709/219 |
| 2012/0212757 | A1 | 8/2012 | Gaertner et al. |
| 2012/0300249 | A1 | 11/2012 | Shustef et al. |
| 2012/0303654 | A1 | 11/2012 | Ferris |
| 2013/0033722 | A1 | 2/2013 | Kamath et al. |
| 2013/0063774 | A1 | 3/2013 | Nuggehalli et al. |
| 2014/0123237 | A1* | 5/2014 | Gaudet ................. H04L 63/101 726/4 |

FOREIGN PATENT DOCUMENTS

WO        0153997        7/2001

* cited by examiner

*Primary Examiner* — Ngon Nguyen
(74) *Attorney, Agent, or Firm* — Gearhart Law, LLC (57) ABSTRACT

A system and method of transferring data between human readable documents using a virtual print driver is disclosed. A first user's computer has a standard text application having a print capability able to output documents in a standard Page Description Language (PDL) file. A virtual print driver then produces an encrypted file that identifies the document source and an intended recipient, establishes a secure link, and transfers the file to a secure cloud store via a secure cloud server that translates the document into a structured format, allowing elements of the document to be accessed individually. The stored document is then accessed in whole, in part, by the intended recipient and third parties authorized by them via a secure communication channel. The intended recipient and the third parties can use the document and/or incorporate further data into, or remove from, the document.

8 Claims, 3 Drawing Sheets

PRINT FUNCTION SYSTEM AND METHOD FOR SECURE CLOUD DATA STORAGE

CLAIM OF PRIORITY

This application claims the priority of U.S. Ser. No. 62/016,803 filed on Jun. 25, 2014, the contents of which are fully incorporated herein by reference.

FIELD OF THE INVENTION

The invention relates to data processing, and more particularly to inter process communication using a virtual device driver.

BACKGROUND OF THE INVENTION

Most organizations in the United States are attempting to go paperless, that is, store, organize, and file their documents digitally. This transition entails storing and using these documents while they are contained in a compact digital format on miniaturized electronic memory devices and avoids having to have filing cabinets of historical data. That digital storage often occurs on the cloud which consists of third party server farms. A significant problem for many businesses, especially smaller offices, is getting existing paper documentation into digital form and then extracting required elements of that data.

This problem is made more difficult in highly regulated industries such as the health industry where statutes such as the Health Insurance Portability and Accountability Act of 1996 (HIPAA) Privacy, Security and Breach Notification Rules impose a significant burden of confidentiality on parties in that industry.

A further significant related problem is the need for different parties within the industry to have access to selected parts of the stored data.

The present invention addresses both of these issues by providing a system and method in which data can be sent in an encrypted form to a secure data storage site via a secure path. That data is then accessible and under the control of one accountable party—in the case of medical data, the person who is the subject of the data. That accountable party can then share some or all of that data with other parties, or give other parties authorization to access specific element of that data. In that way, a patient may control access to, and sharing of, their own medical data. So a patient having multiple care practitioners may easily share relevant information such as, but not limited to, updated insurance plans, basic information about address and history as well as specific data relevant to a particular care provider without allowing access to irrelevant data, personal data. For instance, a patient with a heart condition may need to share data on medications, but may not want to share data on past psychiatric issues.

DESCRIPTION OF THE RELATED ART

United States Patent Application 20080294976 submitted by Eyal Rosenberg and published on Nov. 27, 2008 entitled "System and method for generating and communicating digital documents" that describes how a document may be sent to a virtual printer which may be a software module configured as a print driver to receive the printer file, retrieve further information from a data repository, and produce a file including both the document image and additional information. The software module may further transmit the document to a central hub, from which it may be further processed and/or transmitted to an intended recipient.

United States Patent Application 20110208836 submitted by John O'Fallon et al. and published on Aug. 25, 2011 entitled "Document Sharing Using a Third-Party Document Delivery Service" that describes a virtual printer which includes a document transfer function can be activated within an application program using the standard operating system print mechanism. When the user selects the virtual printer, the software performs the steps of converting the document to a standard display file, requesting a document delivery from a database server, receiving a unique identifier and a name of a file server, uploading the standard display file corresponding to the document, to the named file server, using the unique identifier as the storage identifier, and displaying, in an outbox, an indication that the document was sent. At a remote site, a Document Delivery Service is configured to perform the steps of accepting document delivery requests, initiating such requests, responding with file transfer instructions (including a unique identifier), receiving the uploaded file, storing the file, accepting polling inquiries received from potential document recipients, responding with a list of available documents addressed to each potential recipient, and enabling the recipient computer to download the standard display file. To ensure confidentiality and avoid tampering or forgery, all communication and data transfers between the client computers and the managed file transfer service carried out over secure network connections.

United States Patent Application 20130063774 submitted by Jayasimha Nuggehalli; et al. and published on Mar. 14, 2013 entitled "Method And Device For Printing A Scheduled Print Job" that describes a method and apparatus for printing a scheduled print job by a printing device connected to a client device over a network. The method includes transmitting, by the client device, a request to print the scheduled print job to the printing device. The scheduled print job includes print data and schedule data corresponding to a scheduled time the print data is to be printed. The printing device obtains the print job from cloud storage or from local storage depending on a storage selection indicator, and executes the scheduled print job at the scheduled time. A determination is made as to whether the scheduled print job was printed successfully at the scheduled time. Further, a message indicating whether the scheduled print job was printed successfully, based on the determination, is sent to a predetermined device.

U.S. Pat. No. 7,404,108 issued to Caplan et al. on Jul. 22, 2008 entitled "Notification method and apparatus in a data processing system" that describes a method of, apparatus for, or storage device medium having instructions for publishing a first notification within a data processing system where the data processing system comprises a first source generating the first notification, a first destination device, and a second destination device. The source may be a storage unit, a printer, a processing unit, or any other device which is a component of the data processing system. The destination device is typically a monitor, a workstation, a computer, a PC, or other input/output type workstation. The method comprises of having the first destination device subscribe to receive notifications from the first source. In addition, the second destination device subscribes to receive the notifications serially republished from the first destination device. Upon the publication of a notification from the first source to the first destination device, the first destination device will publish the notification to the second destination device.

Various implements are known in the art, but fail to address all of the problems solved by the invention described herein.

One embodiment of this invention is illustrated in the accompanying drawings and will be described in more detail herein below.

SUMMARY OF THE INVENTION

An inventive system and method of transferring data between human readable documents using a virtual print driver is disclosed.

In a preferred embodiment, a first user having a first computer may have a document such as, but not limited to, a standard form, that may be accessible by a first application, such as, but not limited to, a Microsoft™ Word™ text processing application.

Such commercial applications invariably have a "print" capability. Because users may choose to use printers from different manufacturers, the industry has evolved to what is essentially a two-step process for printing. The application almost always has the capability to output any document created using it into a Page Description Language (PDL) file that is typically standardized. The printer manufacturer then typically provides a print driver that is a software module that translates the PDL file description of the document into machine instructions that may be a pixel element description of the document to be printed and which enables the printer to actually print the document on paper in the required human format.

Practically all applications operating on a person computer have this capability to produce an intermediate file specifying the document layout and structure in a standard PDL file. The present invention takes advantage of this. In the present invention, a computer program is provided that acts as a virtual print driver, but instead of converting the PDL file into a raster file suitable for use by a printer to print out the document, the virtual print driver of this invention produces an encrypted file that may have both the PDL file as well as an identity of document source, and an identity of an intended recipient of the document.

The virtual driver may then establish a secure link using a protocol, such as, but not limited to, a Secure Sockets Layer (SSL), a Transport Layer Security (TLS) link, or some combination thereof. The secure link may be to a cloud based secure data storage facility associated with, or accessible by, the intended recipient. The virtual driver may then transmit that encrypted document from the first user's facility to the secure storage unit.

The secure data repository may also have the capability to convert the encrypted document into a secure structured document such as, but not limited to, an XML representation of the document. This conversion may use knowledge of the sender of the document, and the current software and hardware they use.

The recipient may then access the document, or the secure structured document, using appropriate security measures such as, but not limited to, a challenge response password or biometric based verification module.

The intended recipient may also provide permission to third parties to some or all of either the original encrypted document or the secure structured document, or some combination thereof.

The recipient or the authorized third party may then receive the requested data via a secure link and may then print of display the data in a human readable form.

Therefore, the present invention succeeds in conferring the following, and others not mentioned, desirable and useful benefits and objectives.

It is an object of the present invention to provide simple but secure method for an entity to access and distribute relevant data.

It is another object of the present invention to provide a simple and secure method for a first party to transmit forms with data to a second party who may then control further access to the data.

Yet another object of the present invention is to provide a HIPPA compliant data sharing device operable between unrelated entities.

DESCRIPTION OF THE PREFERRED EMBODIMENTS

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations can be made thereto.

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI (X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices, such as other components of the cooling chest system, including temperature sensors, ice dispensers (if provided) and the like may be connected and/or communicate to I/O and/or other facilities of the like such as network interfaces, storage interfaces, directly to the interface bus, system bus, the CPU, and/or the like. Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, ice maker, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users (e.g., operators and physicians) table may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table may include fields such as, but not limited to: user_id, client_id, client_ip, client_type, client_model, operating_system, os_version, app_installed_flag, and/or the like. An Apps table may include fields such as, but not limited to: app_ID, app_name, app_type, OS_compatibilities_list, version, timestamp, developer_ID, and/or the like. A beverages table including, for example, heat capacities and other useful parameters of different beverages, such as depending on size beverage_name, beverage_size, desired_coolingtemp, cooling_time, favorite_drinker, number_of_beverages, current_beverage_temperature, current_ambient_temperature, and/or the like. An Parameter table may include fields including the foregoing fields, or additional ones such as cool_start_time, cool_preset, cooling_rate, and/or the like. A Cool Routines table may include a plurality of cooling sequences may include fields such as, but not limited to: sequence_type, sequence_id, flow_rate, avg_water_temp, cooling_time, pump_setting, pump_speed, pump_pressure, power_level, temperature_sensor_id_number, temperature_sensor_location, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

Figure 1:
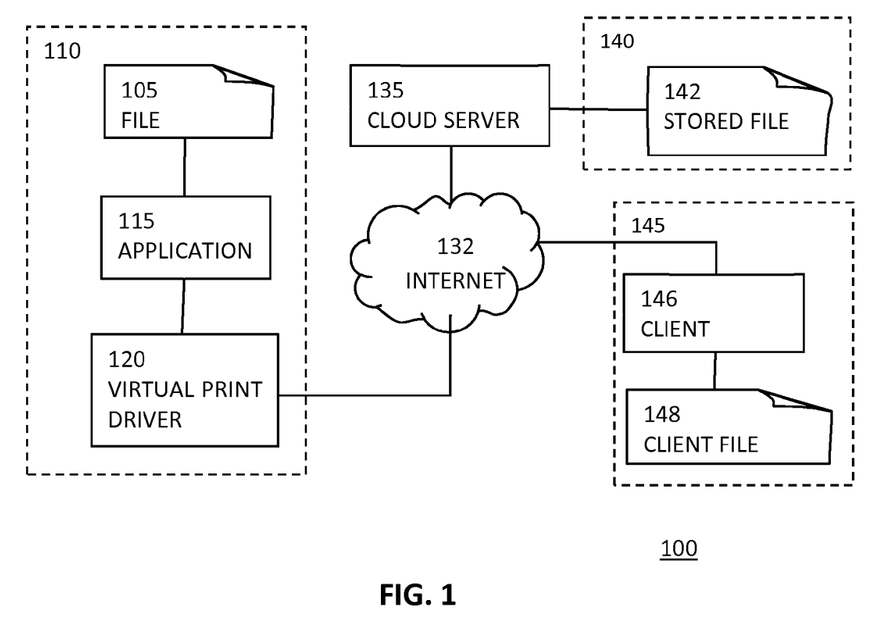
FIG. 1 shows schematic overview of a system and method of transferring data between human readable documents of the present invention.

FIG. 1 shows schematic overview of a system and method of transferring data between human readable documents of the present invention.

A first human readable document 105 may be stored digitally on a first user's computer 110 in a format suitable for use with a first software application 115.

The first application 115 may, for instance, be a word or data processing application such as, but not limited to, the Microsoft Corporation's Word™ or Excel™ software application.

Such software applications typically incorporate functionality enabling documents to be displayed on a display screen in a human readable form and to enable a printer to print the document in a human readable form on a standard sheet of paper such as, but not limited to, to a letter, legal or A4 sized sheet of paper.

The functionality to enable printing typically requires a print driver software module that may be peculiar to a printer connected to the user's computer.

In a preferred embodiment of the present invention, in addition to a conventional print driver, there may also, or instead, be a virtual print driver 120.

The act of printing the file via the application to the virtual print driver 120 may then not produce a document printed on paper, but instead initiate producing an encrypted file and then sending that file via the Internet 132 to a cloud server 135 that may then store the file on secure data repository 140.

An entity 145 that may be identified by the stored file 142 as having permission to access the file may, for instance, be a client 146 who may use a computer to access the stored file 142 via the Internet 132 and the cloud server 135 and obtain their own copy as a client file 148.

This client file 148 may then be rendered by a software application on their computer as a human readable file on a computer display, or printed as a human readable file on paper, and may be an accurate representation of the data originally stored on first human readable document 105.

Figure 2:
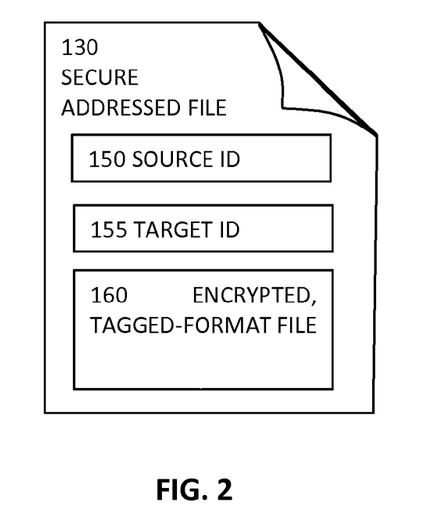
FIG. 2 shows a schematic outline of the structure of a secure, addressed file of the present invention.

FIG. 2 shows a schematic outline of the structure of a secure, addressed file of the present invention.

In a preferred embodiment, the secure, addressed file 130 may include at least three element.

Firstly there may be a source ID 150. This may, for instance, be an alpha-numerical indicia that indicates information pertaining to the source of the document such as, but not limited to, an identity of the first user's computer 110, a nature of the first application 115, a nature of the virtual print driver 120, or some combination thereof. These identities and natures may, for instance, include parameters or indices indicative of information such as, but not limited to, product types, version numbers, equipment identifiers, physical location via GPS or other location identification means, names and/or authorization levels or categories of people authorized to see, alter or otherwise interact with the document, application or virtual print driver or some combination thereof.

Secondly, there may be a target ID 155. This may, for instance, be an alpha-numerical indicia that indicates information pertaining to who may access the secure, addressed file 130. This may include information such as, but not limited to, a name of an individual person, their Social Security number, their tax identification number, the address at which they reside, their date of birth, an account number recognized by the cloud server, or some combination thereof.

A third part of the secure, addressed file 130 may be an encrypted, tagged-format file 160. This element of the file may, for instance, be produced by the virtual print driver 120.

Although the examples above have, for simplicity, been stated in terms of alpha-numeric strings, one of ordinary skill in the art may appreciate that the first human readable document 105 may contain some, or be all, multi-media content containing audio, video or photography and the indicia in the secure, addressed file 130 may be graphical in nature using, for example, images or bar codes. However, in a digital system all such data is typically reduced to a binary or similar alpha-numeric string, and the description above is, therefore, intended to include all multimedia forms that may be represented as binary strings of digital data.

Figure 3:
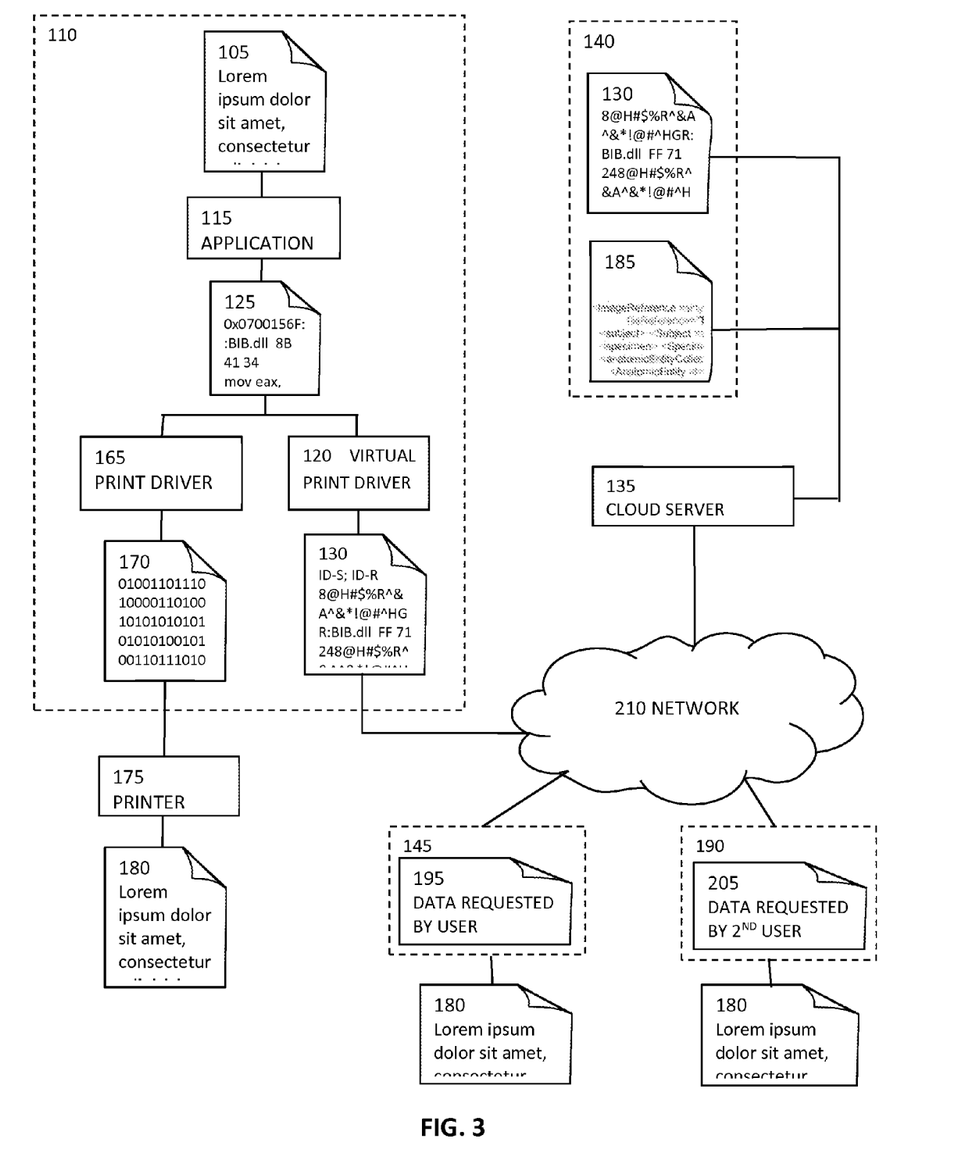
FIG. 3 shows a detailed schematic of a system and method of transferring data between human readable documents of the present invention.

FIG. 3 shows a detailed schematic of a system and method of transferring data between human readable documents of the present invention.

The first user's computer 110 may be running a first application 115 that may be processing data that may be representative of human readable or intelligible multimedia such as, but not limited to, text, images, video and audio or some combination thereof.

There may, for instance, be a first human readable document 105 that may be accessed by the first application 115 for purposes such as, but not limited to, display, editing, copying or printing or some combination thereof. One of the purposes that an application 115 may to print the document 105 on paper via a printer 175. In order to do this the first application 115, in response to a user requesting that the document be printed, may first translate this into a Page Description Language (PDL) file 125. PDL is a de facto standard format used so that applications may more easily interface with physical printers.

The printer manufacture typically provides a print driver 165. This may be a software module operative on the first user's computer 110 that performs the function of translating the Page Description Language (PDL) file 125 into a raw binary dot pattern file 170 that may be used by the printer to produce a human readable, printed on paper, document 180.

In a preferred embodiment of the present invention, there may be a virtual print driver 120 that may be a software module operative on the first user's computer 110. The virtual print driver 120 may appear to the first application 115 as a printer to which document may be sent for printing. The virtual print driver 120 may, however, have a different functionality. Instead of converting the Page Description Language (PDL) file 125 into a raw binary dot pattern file 170 suitable for use by a printer, it may instead convert the Page Description Language (PDL) file 125 into a secure, addressed file 130. The virtual print driver 120 may also initiate sending the secure, addressed file 130 via a public digital data network 210 to a cloud server 135.

The cloud server 135 may be programmed to perform the function of storing the secure, addressed file 130 on a secure data repository 140 that may, for instance, be attached directly to the cloud server 135.

The cloud server 135 may also be programmed to perform the function of extracting data from the secure, addressed file 130 and converting it to a tagged-format file 185. The tagged-format file 185 may, for instance, be in a format such as, but not limited to, XML. The tagged-format file 185 may also be stored in the secure data repository 140.

The entity 145 identified by the target ID associated secure, addressed file 130 may access the cloud server 135 via the public digital data network 210. After authenticating that the identity of the entity 145 matches the identity and is the recipient that the secure, addressed file 130 is mean for, the cloud server 135 may send a data file request by the user 195. The data file request by the user 195 may be all or part of the data stored on the secure, addressed file 130 or the tagged-format file 185, or some combination thereof.

The entity 145 that may, for instance, be a computer or other digital device accessible to or controlled by a patient, may cause the requested data to be printed or otherwise displayed as a human readable document 180 that may be printed on paper.

In a preferred embodiment of the present invention a second user 190 may also have permissions that may, for instance, be granted by designated entity 145 to obtain all or part of the data stored on the secure data repository 140 that may be under the control of the cloud server 135.

The second user 190 may receive a data file 205 requested by them, or sent to them by the target entity 145. This data file may, for instance, be displayed in human readable form on a display device, printed out by a printer as a human readable, printed document 180 on paper, or presented audibly as audio delivered by a synthesized voice.

Figure 4:
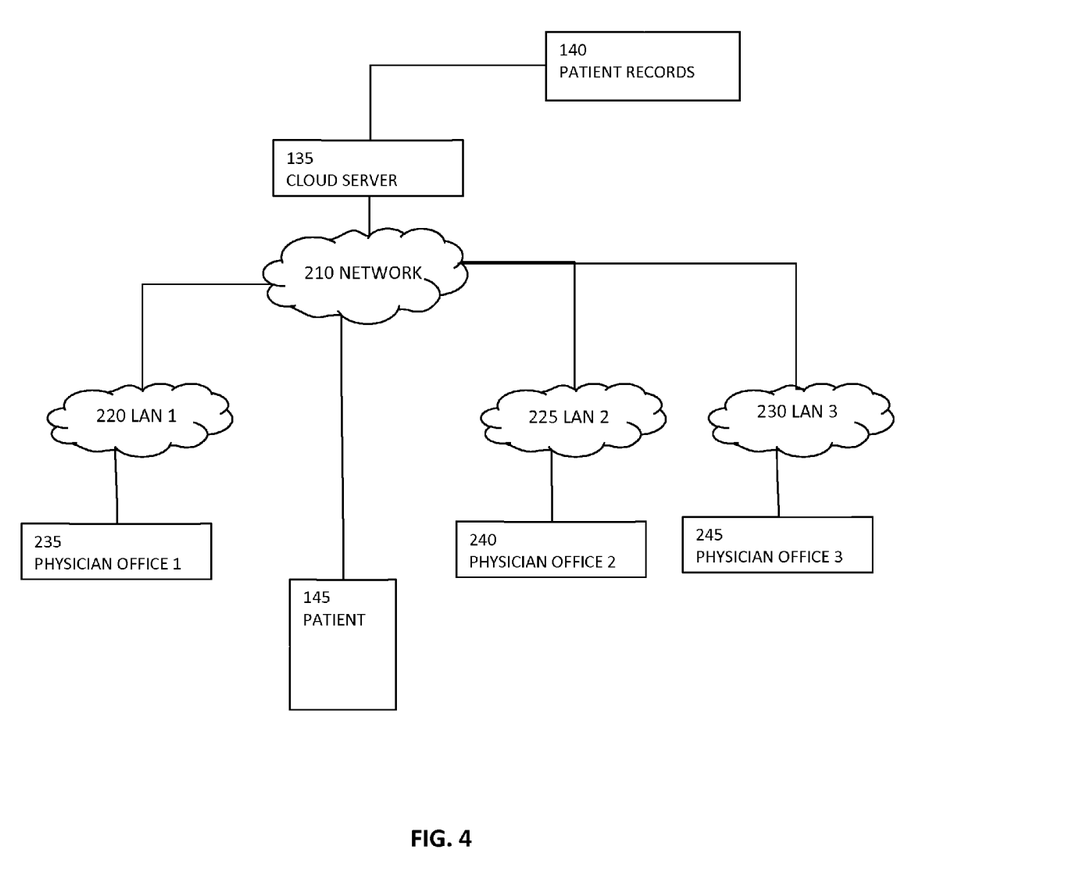
FIG. 4 shows a schematic of a system of sharing confidential data between multiple offices and an entity having dealings with each of the offices.

FIG. 4 shows a schematic of a system of sharing confidential data between multiple offices and an entity having dealings with each of the offices.

As depicted in FIG. 4 each of the offices is envisioned as being a physician's office that may each be part of a local network. For instanced a first physician office 235 may be part of a first local area network 220, a second physician office 240 may be part of a second local area network 225 and a third physician office 245 may be part of a third local area network 230. However, all of these offices may have a connection to a cloud server 135 via a public digital data network 210 that allows them access to a secure data repository 140 containing patient records. A patient 145 may also have access to the secure data repository 140 via the public digital data network 210 and the cloud server 135.

In this manner a patient may obtain services from a number of physician offices each of which may be part of their secure hospital or medical group network, but may, via the cloud server 135 be able to securely and confidentially share pertinent aspects of the patients medical records, in a HIPPA compliant manner, with the patient maintaining control of access to those securely stored records. This may obviate the need for, amongst other things, patients having to fill out detailed forms about their medical history each time they visit a physician's office.

Although the invention has been described with reference to physician's offices and medical records, one of ordinary skill in the art will appreciate that the system and method of the invention may be applied to many other situations such as, but not limited to, accounting offices and financial information, legal offices and legal information or some combination thereof.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of transferring data between human readable documents, comprising:

providing a first human readable document resident on a first user's computer in an application format required by a first application;

printing said first document to a virtual print driver, said printing comprising said first application outputting said first document as a Page Description Language (PDL) file;

converting, by said virtual print driver, said PDL file into a secure, addressed file comprising an encrypted, tagged-format file version of said first document, a source ID and a target ID;

transmitting said secure addressed file to a cloud server; and storing said secure addressed file, by said cloud server, in a secure data repository accessible by an entity identified by said target ID.

2. The method of claim 1 further comprising stripping data from relevant fields of said secure addressed file, by said cloud server, using information comprising said source ID and a version number of said first application operable on said first user's computer from which first document was printed.

3. The method of claim 2 further comprising storing said stripped data in a tagged-format file in said secure data repository.

4. The method of claim 3 further comprising:
requesting by a second user, data stored in said tagged-format file; and
transmitting said requested data to said second user.

5. The method of claim 3 further comprising receiving from a second secure, addressed file intended for said entity identified by said target ID, stripping data from relevant fields of said second secure addressed file, by said cloud server, using information comprising said source ID and a version number of said first application operable on said first user's computer from which first document was printed.

6. The method of claim 5 wherein said first secure file is received from a first physician office and said second secure, addressed file is received from a second physician office.

7. The method of claim 6 wherein said tagged-format file comprises data stripped from both said first and said second secure addressed files.

8. The method of claim 7 further comprising receiving a request for data from said tagged-format file from a third physician office and sending said requested data to said third physician office.

* * * * *